United States Patent [19]

Hata

[11] 4,418,392
[45] Nov. 29, 1983

[54] MEASURING DEVICE

[75] Inventor: Yoogo Hata, Otawara, Japan

[73] Assignee: Tokyo Shibaura Denki Kabushiki Kaisha, Kawasaki, Japan

[21] Appl. No.: 276,527

[22] Filed: Jun. 23, 1981

[30] Foreign Application Priority Data

Jun. 26, 1980 [JP] Japan ............................ 55-85909

[51] Int. Cl.³ .................................... G06F 15/20
[52] U.S. Cl. .................... 364/571; 364/557
[58] Field of Search ............ 364/571, 573, 557; 73/1 F

[56] References Cited

U.S. PATENT DOCUMENTS

| | | | |
|---|---|---|---|
| 3,916,173 | 10/1975 | Williams, Jr. et al. | 364/571 |
| 4,031,630 | 6/1977 | Fowler | 364/571 |
| 4,192,005 | 3/1980 | Kurtz | 364/571 |
| 4,223,388 | 9/1980 | Nishikawa et al. | 364/571 |
| 4,282,578 | 8/1981 | Payne et al. | 364/573 |
| 4,303,984 | 12/1981 | Houvig | 364/571 |

Primary Examiner—Gary Chin
Attorney, Agent, or Firm—Finnegan, Henderson, Farabow, Garrett & Dunner

[57] ABSTRACT

A measuring device provided with a memory unit for storing correction data, wherein the memory unit is controlled by a control circuit; the correction data is transmitted to a main memory through an input-output device; a transducer measures living body data, and converts the measured data into an electric signal; a digital signal converted from the electric signal by an analog-digital converter is delivered to a central processing unit as measured data; the transducer, memory unit and control circuit jointly constitute a measurement-correcting module, which is detachably attached to the input-output device; the central processing unit corrects the measured data by the correction data stored in the main memory, and converts the corrected measured data into a display signal; and a display device indicates the measured data in accordance with the display signal received.

2 Claims, 4 Drawing Figures

MEASURING DEVICE

BACKGROUND OF THE INVENTION

This invention relates to a measuring device which measures required data and converts said measured data into electric signals, and more particularly to a measuring device which is provided with correcting means capable of correcting measured data with a high precision over a broad range of operation.

Measuring means known to date includes transducers for detecting data obtained from, for example, a living body (living body data). One of the known transducers which measures the temperature of a living body is a thermistor transducer. This thermistor transducer raises problems in respect of the linearity of measured data, and the exchangeability of said transducer and its heat time constant. Therefore, a correction circuit is generally attached to the transducer to correct for its properties. Similar difficulties arise with other forms of transducers, which are therefore usually provided with a correction circuit.

FIG. 1 is a schematic block diagram of the above-mentioned conventional transducer-type measuring device applied to a living body data-measuring apparatus. A living body data-detecting transducer 10 is connected to a correction circuit 12 which corrects for the properties of said transducer 10. Both transducer 10 and correction circuit 12 are integrally assembled to jointly constitute a measurement-correcting module 14. An output signal from the correction circuit 12 is amplified by an amplifier 16. The amplified signal is converted into an 8-bit digital signal by an analog-digital (A-D) converter 18. A converted digital signal is transmitted to a display unit 20 to be indicated as measured data based on, for example, the temperature of a living body.

A correction circuit used with the above-mentioned measuring device is generally formed of resistors assembled with capacitors. Therefore, a corrected data obtained at a specified point of the transducer at which correction is to be made is used as a standard. Therefore, the conventional living body data-measuring transducer has the drawback that correction cannot be effected over the broad operation range of the transducer. Further drawbacks of the conventional living body data-measuring transducer are that the correcting property of the correction circuit 12 is affected, for example, by the temperature characteristic of the parts of said circuit 12 and changes with time in the performance of said parts; where the constant of parts is not fixed, such parts have to be provided in large number in order to elevate the correction precision of the correction circuit 12, thereby rendering the entire measuring apparatus bulky and increasing its cost; and if it is attempted to adjust the performance of the correction circuit 12 by trimming during manufacture for elevation of the correction precision of said circuit 12, then the cost of the entire measuring device is further increased.

SUMMARY OF THE INVENTION

It is accordingly the object of this invention to provide a measuring device which is equipped with a correction circuit that can correct for the properties of the measuring means for converting required measured data into electric signals with high precision over the broad operation range of said measuring means.

To attain the above-mentioned object, this invention provides a measuring device which comprises:

measuring means for measuring required data and converting the measured data into electric signals;

analog-digital conversion means which is connected to the measuring means to convert analog electric signals delivered from the measuring means into digital signals;

correction means which is connected to the analog-digital converting means, which stores correction data obtained by comparison with the standard property of individual elements of the measuring means, compares measured data obtained from the measuring means through the analog-digital conversion means with the previously stored standard property of the individual elements of the measuring means, and reads out the correction data in accordance with the result of comparison, thereby finally correcting the measured data; and display means which is connected to the correction means and indicates corrected measured data in accordance with a signal sent forth from the correction means.

A measuring apparatus embodying this invention which is arranged as described above can correct for the properties of the measuring means over the broad range of its operation. The correction of measured data which is digitally carried out is not affected by the temperature characteristic of the parts of the correction circuit or by changes with time in their performance, as has been the case with the conventional measuring device. Therefore, the measuring device of the invention can correct measured data with high precision.

BRIEF DESCRIPTION OF THE DRAWINGS

By way of example and to make the description clearer, reference is made to the accompanying drawings, in which.

DETAILED DESCRIPTION OF THE PREFERRED EMBODIMENTS

Figure 1:
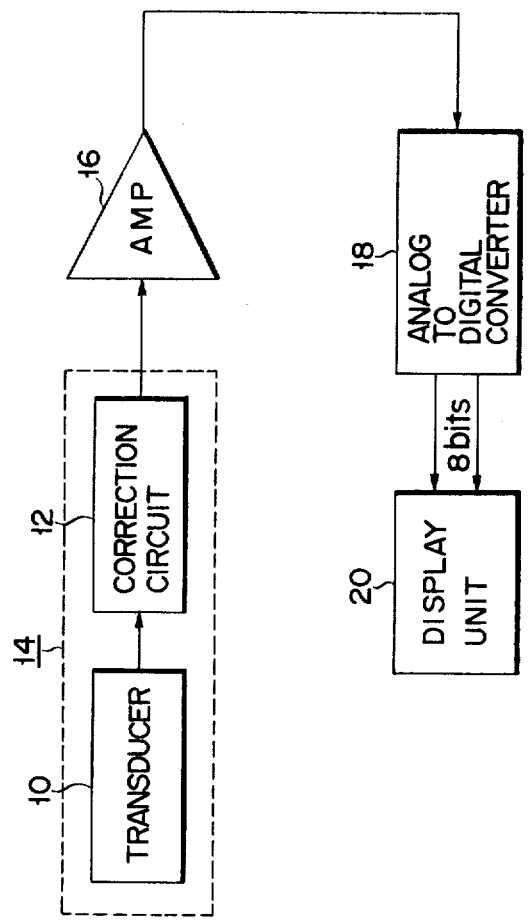
FIG. 1 is a schematic block diagram of the prior art living body data measuring device.
Figure 2:
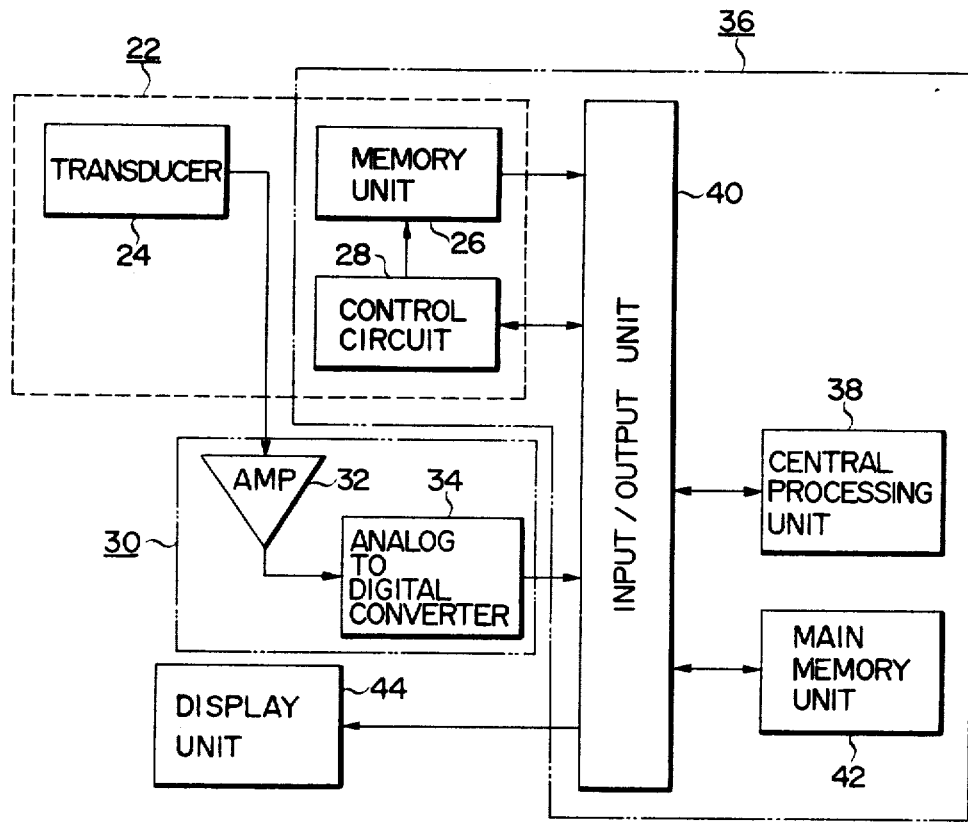
FIG. 2 is a schematic block diagram of a measuring device according to a first embodiment of this invention applied to a living body data-measuring apparatus.

FIG. 2 is a schematic block diagram of a measuring device according to a first embodiment of this invention applied to a living body data-measuring apparatus. A measurement-correcting module 22 is formed of an integral assembly of:

a transducer 24 for detecting living body data and converting the detected data into electric signals;

a memory device 26 for storing correction data to correct for the properties of the transducer 24; and a control circuit 28 for writing the correction data in the memory device 26 and reading the correction data therefrom.

An analog-digital conversion circuit 30 comprises:

an amplifier 32 connected to the transducer 24 to amplify an output signal (for example, a voltage signal) therefrom; and an analog-digital converter 34 connected to the amplifier 32 to convert an output signal therefrom into a digital signal.

A correction circuit 36 comprises:
the memory device 26;
the control circuit 28;
a central processing unit (CPU) 38, which is formed of, for example a, microcomputer, carries out operations in accordance with a prescribed processing program and sends forth a prescribed control signal;
an input-output device 40 (formed of, for example, a digital multiplexer) which is connected to the CPU 38, controls the operation of the control circuit 28 by output control signals from the CPU 38, effects the writing of data in the memory device 26 and the reading of data therefrom, and further controls the operation of other connected devices and carries out the writing of data in said other devices and the reading of data therefrom; and
a main memory 42 connected to the input-output device 40 in which data obtained by comparison with the standard property of the transducer is successively stored, starting with those locations of said memory 42 which bear smaller address numbers, and, upon receipt of a control signal from the CPU 38, receives data from the input-output device 40 and supplies data thereto.

A display device 44 is connected to the input-output device 40. Upon receipt of a control signal from the CPU 38, the input-output device 40 sends forth a digital signal to said display device 44, which in turn exhibits corrected measured data converted from said digital signals.

The analog-digital converter 34 is also connected to the input-output device 40, and, upon receipt of a control signal from the CPU 38, transmits data to said input-output device 40.

Figure 3:
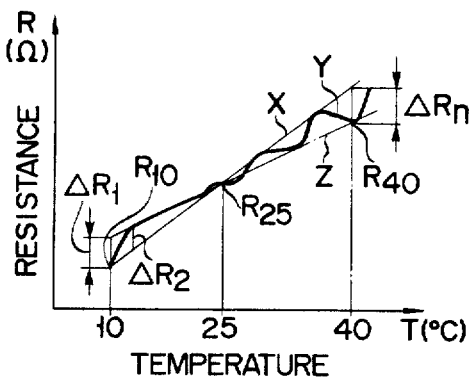
FIG. 3 depicts the standard property of the transducer 24 of FIG. 2 and the property of said transducer corrected by actual measurement.

Description is now given with reference to FIG. 3 of an example of correction data to be stored in the memory device 26. FIG. 3 indicates the property of a thermistor used as the transducer 24. A resistance R ($\Omega$) is indicated in the ordinate, and a temperature T (°C.) is set forth on the abscissa. A solid straight line X shows the standard property of the thermistor, and a curve Y represents a value actually measured by the thermistor. With the foregoing embodiment, the thermistor resistance is chosen to have a standard value of R25 as measured at 25° C. Further, it is assumed that a minimum thermistor resistance measured at 10° C. is R10; a maximum thermistor resistance measured at 40° C. is R40; a straight line Z extending between the points denoting R25 and R40 represents the thermistor property for correction. The correction property of the thermistor need not be defined by the above-mentioned process. It is possible to determine said correction property by a curve connecting three points R40, R25, and R10. Further, it may be advised to increase the number of points of actual measurement and determine the correction property of the thermistor by a curve more closely approximating said curve of actual measurement from a curve connecting said increased number of points of actual measurement.

With the foregoing embodiment, differences between the resistances accompanying the correction property Z and the standard property X of the thermistor simultaneously measured at a plurality of temperature levels are indicated as $\Delta R1$ to $\Delta Rn$ (where n is a natural number). These resistance differences $\Delta R1$ to $\Delta Rn$ are matched with the temperature levels at which both properties Z, X are compared. These data are successively stored in digital form in the memory device 26 for the purpose of correction, starting with those locations of said memory device 26 which bear smaller address numbers. With the foregoing embodiment, the resistance differences $\Delta R1$ to $\Delta Rn$ and temperatures were matched with each other. However, it is possible to mutually match in the form of a time constant the response characteristics of the thermistor at the points at which said correction property Z and standard property X of the thermistor are compared, and apply the data thus obtained for correction.

Description is now given of the operation of a measuring apparatus embodying this invention. Living body data measured by the transducer 24 is converted into a voltage signal, and supplied to the amplifier 32. A voltage signal amplified by the amplifier 32 is converted into a digital signal by the analog-digital converter 34. Thereafter, the converted digital signal is supplied to the CPU 38 through the input-output device 40. Prior to the above-mentioned operation, the CPU 38 sends forth a control signal to the control circuit 28 through the input-output device 40 in accordance with a prescribed program. Correction data stored in the memory device 26 is read out, and successively stored through the input-output device 40 in the respective locations of the prescribed memory area of the main memory 42.

Measured data supplied to the CPU 38 through the input-output device 40 undergoes the following correction in the CPU 38. Namely, differences are successively obtained between the resistances accompanying the standard property of the transducer which are measured at prescribed temperature levels and the resistances shown by the measured data. Comparison is successively made between the above-mentioned resistance differences and the resistance differences $\Delta R1$ to $\Delta Rn$ stored for correction in the main memory device 42. Where coincidence occurs between any of the above-mentioned resistance differences and any of the correction resistance differences stored in the main memory 42, then correction data corresponding to the coinciding resistance differences is selected for correction of the measured data. To describe in greater detail, differences between the resistances of the measured data and the resistances accompanying the standard property of the transducer are compared with the resistance differences $\Delta R1$ to $\Delta Rn$ of the correction data which are each made to have a certain range. Where any of the differences between the resistances of the measured data and the resistances accompanying the standard property of the transducer falls within any of the ranges allotted to the resistance differences $\Delta R1$ to $\Delta Rn$ of the correction data, then coincidence is considered to exist between both forms of resistance differences.

The measured data is corrected by the correction data selected by the above-mentioned procedure. Where, in FIG. 3, the measured data is positioned on the left side of the reference value R25, then the correction data is subtracted from the measured data. Where the measured data lies on the right side of the reference value R25, then the correction data is added to the measured value. After being subjected to any other required correction, the measured data is transmitted to the display device 44 in the form adapted for display.

With the first embodiment, data measured by the transducer 24 is corrected by correction data stored in the memory device 26, thereby enabling the linearity of the transducer 24 to be corrected over the broad range of its operation. Further, the digital correction of the first embodiment is carried out more quickly and with higher precision than the analog correction followed in the prior art measuring device, without being affected, for example, by temperature. The measurement-correcting module 22 detachably attached to the input-output device 40 can be easily exchanged for any other proper measurement-correcting module.

Figure 4:
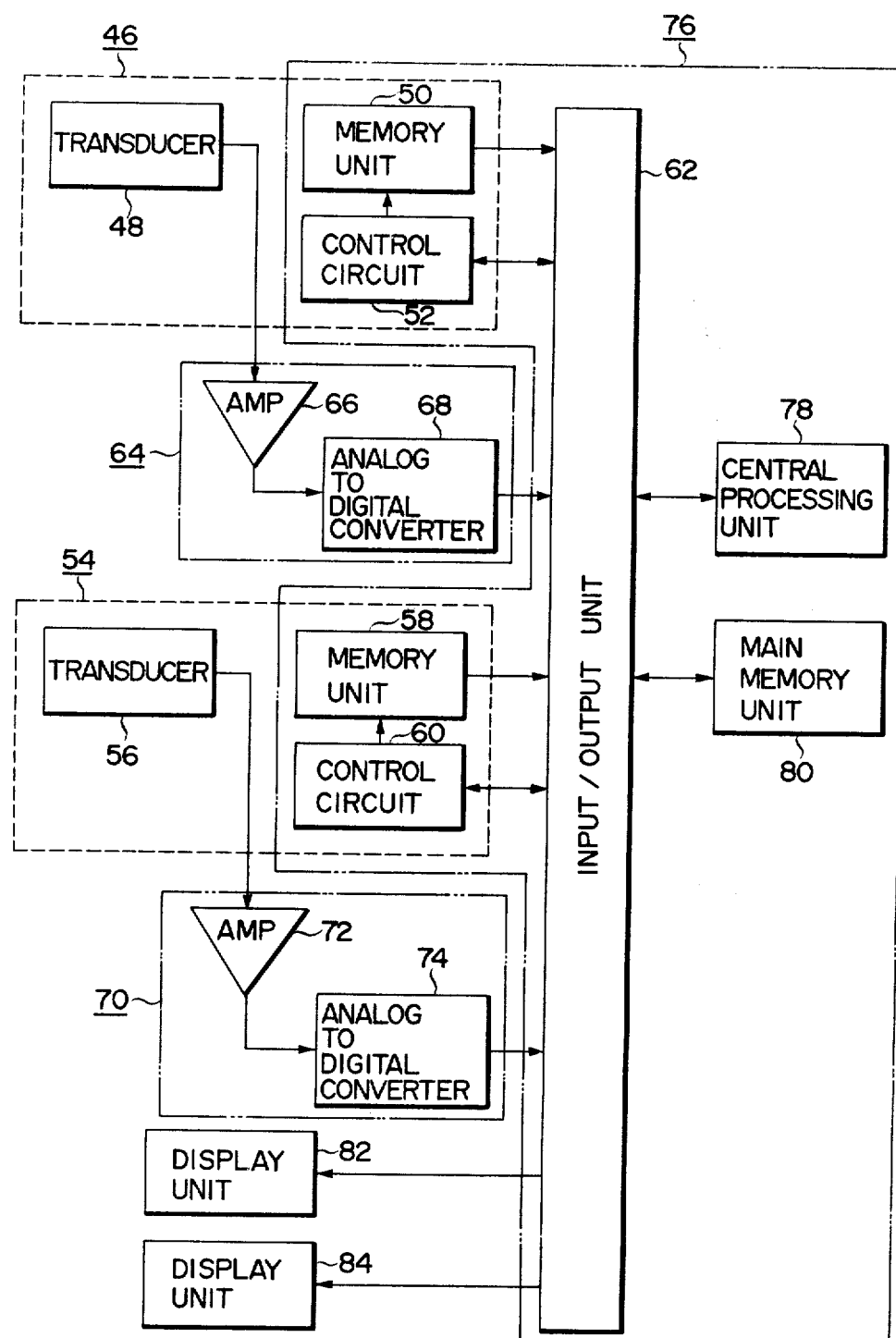
FIG. 4 is a schematic block diagram of a measuring device according to a second embodiment of the invention applied to a living body data-measuring apparatus.

Description is now given with reference to the schematic block diagram of FIG. 4 of a measuring device according to a second embodiment of this invention applied to a living body data-measuring apparatus. The second embodiment is constructed by additionally providing the first embodiment with another measurement-correcting module, analog-digital conversion circuit and display device.

A first measurement-correcting module 46 comprises a first transducer 48, a first memory unit 50 and a control circuit 52 connected to said first memory unit 50. A second measurement-correcting module 54 comprises a second transducer 56, a second memory unit 58, and a control circuit 60 connected to said second memory unit 58. These first and second measurement-correcting modules 46, 54 are detachably fitted to an input-output device 62.

The first transducer 48 is connected to the input-output device 62 through a first analog-digital converting circuit 64. This first analog-digital converting circuit 64 comprises a first amplifier 66 and a first analog-digital converter 68 connected to said first amplifier 66. The second transducer 56 is connected to the input-output device 62 through a second analog-digital converting circuit 70. This second analog-digital converting circuit 70 comprises a second amplifier 72 and a second analog-digital converter 74 connected to said second amplifier 72.

A correction circuit 76 comprises the first memory unit 50, control circuit 52, second memory unit 58, control circuit 60, input-output device 62 connected to said second memory unit 58 and control circuit 60, central processing unit (CPU) 78 connected to said input-output device 62, and main memory 80 connected to the input-output device 62.

The input-output device 62 is further connected to the first and second analog-digital converting circuits 64, 70, first display device 82 for indicating data measured by the first transducer 48 and second display device 84 for indicating data measured by the second transducer 56.

Data for correcting a measurement made by the first transducer 48 is stored in the first memory unit 50. Data for correcting a measurement made by the second transducer 56 is stored in the second memory unit 58.

With the second embodiment arranged as described above, let it be assumed that a measured output y from the first transducer 48 is a function f of pressure and temperature and may be expressed as $$y = f(x, t) \quad (1)$$

where:
x = variable denoting pressure
t = variable representing temperature
and that a measured output t from the second transducer 56 is a function g of resistance and may be expressed as $$t = g(R) \quad (2)$$

where: R = variable denoting resistance.

In the above-mentioned case, the first transducer 48 is chosen to measure pressure, and the second transducer 56 is used to measure temperature.

Data on the pressure of a living body is measured by the first transducer 48 and converted into an electric signal. The converted electric signal is supplied to the first analog-digital converting circuit 64. An output converted digital signal from said A-D converting circuit 64 is delivered to the CPU 78 through the input-output device 62.

Data on the temperature of a living body is measured by the second transducer 56, and converted into an electric signal. The converted electric signal is sent forth to the second analog-digital converting circuit 70. An output converted digital signal from said A-D converting circuit 70 is conducted to the CPU 78 through the input-output device 62.

As seen from the formula (1) above, data on the pressure of a living body is affected by temperature.

To eliminate an effect exerted by temperature, measurement of pressure is corrected by a correction of temperature measured by the second transducer 56, as well as by data for correcting a measurement made by the first transducer 48.

Corrected data on pressure and temperature are converted into display signals by the CPU 78, and respectively transmitted to the first and second display devices 82, 84.

With the second embodiment, data on pressure is corrected, as previously described, by corrected data on temperature and by pressure-correcting data. Therefore, pressure is corrected with a higher precision than when pressure is corrected simply by pressure-correcting data.

With the second embodiment, measurement made by the first transducer 48 was corrected by data for correcting data measured by the second transducer 56. However, it will well serve the practical purpose, if separate data on the temperature and pressure of a living body are separately corrected, and the corrected data are respectively indicated on the display devices 82, 84. Further, the input-output device 62 may be provided with more than three measurement-correcting modules and the corresponding number of analog-digital converting circuits and display devices.

This invention is not limited to the aforementioned first and second embodiments. Obviously, the invention may be practised in various modifications without departing from the scope and object of the invention.

What is claimed is:

1. A measuring apparatus comprising:
   a. measuring means including a plurality of transducers for measuring a plurality of different data and converting the measured data into analog electrical signals;
   b. analog-digital converting means connected to the measuring means to convert analog electric signals from the measuring means into digital signals;
   c. correction means connected to the analog-digital converting means for storing a plurality of different correction data for the plurality of measured data, for correcting each of the measured data using the corresponding correction data, and for further correcting a first of the corrected measured data using a second of the corrected measured data, said first corrected measured data being a function of at least two variable factors and said second corrected measured data being a function of at least one variable factor and being one of said at least two variable factors of said first corrected measured data; and d. display means connected to the correcting means for displaying corrected measured data.

2. The measuring apparatus according to claim 1, wherein the correction means comprises:

a. a plurality of correcting modules respectively housing said plurality of transducers;

b. a plurality of memory units respectively included in the corresponding correcting modules for storing correction data corresponding to the respective transducers;

c. a plurality of control circuits respectively included in the corresponding correcting modules and connected to the corresponding memory units to control the reading of the correction data;

d. an input-output device to which the correcting modules are detachably fitted, and which is connected to the memory units, control circuits and converting means, thereby controlling the transmission and reception of data;

e. a main memory connected to the input-output device, which stores the standard properties of the respective transducers and correction data delivered from the memory units; and f. a central processing unit connected to the input-output device, which compares each of the measured data with the standard property of the corresponding measuring means, selects a prescribed correction data in accordance with the result of said comparison, and corrects the measured data by said selected prescribed correction data.

* * * * *